(12) United States Patent
Sawicki

(10) Patent No.: US 10,786,879 B2
(45) Date of Patent: Sep. 29, 2020

(54) NOZZLE WITH CHANGEABLE PRESS FIT

(71) Applicant: Hamilton Sundstrand Corporation, Charlotte, NC (US)

(72) Inventor: Piotr Sawicki, Bogdaniec (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 334 days.

(21) Appl. No.: 15/363,810

(22) Filed: Nov. 29, 2016

(65) Prior Publication Data
US 2017/0232563 A1   Aug. 17, 2017

(30) Foreign Application Priority Data
Feb. 11, 2016   (EP) .................................. 16155188

(51) Int. Cl.
*B23P 19/02* (2006.01)
*F15B 19/00* (2006.01)
*F15B 13/043* (2006.01)
*F16K 31/12* (2006.01)

(52) U.S. Cl.
CPC .......... *B23P 19/02* (2013.01); *F15B 13/0438* (2013.01); *F15B 19/002* (2013.01); *F16K 31/12* (2013.01)

(58) Field of Classification Search
CPC .... B23P 19/02; F15B 19/002; F15B 13/0438; F16K 31/12
See application file for complete search history.

(56) References Cited

U.S. PATENT DOCUMENTS

| | | | | | |
|---|---|---|---|---|---|
| 1,738,915 | A | * | 12/1929 | Mueller | F16L 15/08 285/148.11 |
| 2,320,435 | A | * | 6/1943 | Hood | B25B 27/143 81/459 |
| 2,924,241 | A | * | 2/1960 | Bauer | F15B 13/0431 137/549 |
| 2,926,696 | A | * | 3/1960 | Kolm, Jr. | F15B 13/0438 137/624.27 |
| 3,211,476 | A | * | 10/1965 | Wagner | F16L 33/213 285/258 |

(Continued)

FOREIGN PATENT DOCUMENTS

EP       2765314 A2   8/2014

OTHER PUBLICATIONS

European Search Report for Application No. 16155188.2; dated Aug. 18, 2016; 6 pages.

*Primary Examiner* — Eric Keasel
(74) *Attorney, Agent, or Firm* — Cantor Colburn LLP

(57) ABSTRACT

A nozzle with changeable press fit and a method for calibrating a nozzle is described. The nozzle may be used in a nozzle/flapper type servovalve. The method comprises the steps of providing a nozzle within a cylindrical body defining a cylindrical bore, the nozzle having a tubular shape with an outer cylindrical surface and an inner radial surface, the method further comprises the steps of positioning a first, tubular locking member within the nozzle, and axially moving the first, tubular locking member within the nozzle. The first tubular locking member is configured to cause the nozzle to become positionally fixed at a selected position within the bore in response to the first, tubular locking member being axially moved relative to the nozzle. A nozzle positioning system is also described herein.

7 Claims, 3 Drawing Sheets

(56) References Cited

U.S. PATENT DOCUMENTS

| | | | | |
|---|---|---|---|---|
| 3,712,339 A | * | 1/1973 | Bartholomaus | F15B 13/0438 137/625.62 |
| 4,893,658 A | * | 1/1990 | Kimura | E21B 17/00 138/109 |
| 5,070,898 A | * | 12/1991 | Jagodzinski | F15B 13/043 137/82 |
| 5,497,807 A | * | 3/1996 | Rogers | F16L 55/1645 138/98 |
| 8,377,131 B2 | * | 2/2013 | Lin | A61B 17/7097 623/17.12 |
| 8,857,036 B2 | * | 10/2014 | Kuebel | F16L 13/147 285/258 |
| 2006/0090799 A1 | | 5/2006 | Achmad et al. | |
| 2009/0321667 A1 | | 12/2009 | Mccollum | |

\* cited by examiner

NOZZLE WITH CHANGEABLE PRESS FIT

FOREIGN PRIORITY

This application claims priority to European Patent Application No. 16155188.2 filed Feb. 11, 2016, the entire contents of which is incorporated herein by reference.

TECHNICAL FIELD

The examples described herein relate to a method for positioning and locking a nozzle in place within a valve body. The examples described herein also relate to a nozzle for positioning and locking in place within a servovalve body. The nozzles and method may be used, amongst other applications, in conjunction with a flapper/type servovalve.

BACKGROUND

A hydraulic servovalve is a servo with a device (either flapper nozzle or jet pipe) used to position the servo. When servovalves are controlled through an electrical signal they are called electrohydraulic servovalves. Servovalves are normally used when accurate position control is required and this position control may be achieved through a closed loop control system, consisting of command sensor, feedback sensor, digital or analogue controller, and the servovalve.

Flapper nozzle systems for use in servovalves are well known. Flapper position is controlled by the electromagnetic torque motor and the torque developed by the torque motor is proportional to the applied current, with currents generally being in the milliamp range. A torque motor consists of two permanent magnets with a coil winding attached to a magnetically permeable armature. The armature is part of the flapper piece. When a current is applied to the coils, magnetic flux acting on the ends of the armature is developed. The direction of the magnetic flux (force) depends on the direction of the current. The magnetic flux will cause the armature tips to be attracted to the ends of the permanent magnets (current direction determines which magnetic pole is attracting and which one is repelling). This magnetic force creates an applied torque on the flapper assembly, which is proportional to the applied current. In the absence of any other forces, the magnetic force would cause the armature to contact the permanent magnet and effectively lock in this position. However, other forces are acting on the nozzle, such that flapper position is determined through a torque balance consisting of magnetic flux (force), hydraulic flow forces through each nozzle, friction on the flapper hinge point, and any spring (wire) connecting the flapper to the spool (which is almost always installed used in servovalves to improve performance and stability).

As the applied current is increased, the armature and flapper will rotate. As the flapper moves closer to one nozzle, the flow area through this nozzle is decreased while the flow area through the other nozzle increases.

Servovalves can be used to control hydraulic actuators or hydraulic motors. When a servoactuator is used to control an actuator, the servovalve and actuator combination are often referred to as a servoactuator. The main advantage of a servovalve is that a low power electrical signal can be used to accurately position an actuator or motor. The disadvantage is their complexity and the resulting costs of components consisting of many detail parts manufactured to very tight tolerances. Therefore, servovalves are generally only used when accurate position (or rate) control is required.

SUMMARY

An example of a method of positioning a nozzle within a cylindrical body is described herein. The method comprises the steps of providing a nozzle within a cylindrical body defining a cylindrical bore; said nozzle having a tubular shape with an outer cylindrical surface and an inner radial surface. The method further comprises the step of moving the nozzle within the cylindrical bore and positioning a first, tubular locking member within said nozzle, and axially moving said first, tubular locking member within the nozzle, said first tubular locking member being configured to cause the nozzle to become positionally fixed at a selected position within the bore in response to the first, tubular locking member being axially moved relative to the nozzle.

Another example of a method described herein comprises a method for positioning a nozzle in the body of a valve, said method comprising providing said nozzle, said nozzle having an outer cylindrical surface and an inner cylindrical surface; providing a first, male, locking member within said nozzle, said first, male, locking member comprising a hollow tube having an outer cylindrical surface and an inner cylindrical surface, and wherein the outer surface of the first locking member comprises a conical shape that is tapered at a first angle; providing a second, female locking member within said nozzle, said second, female, locking member comprising a hollow tube having an outer cylindrical surface and an inner cylindrical surface; said outer cylindrical surface of said female locking member being in contact with said inner cylindrical surface of said nozzle, and wherein the inner surface of the second locking member has a conical shape that is tapered at a second angle; and wherein said first angle and said second angle are equal; said method further comprising positioning said nozzle in said body of said servovalve; and moving said first, male, locking member inside said second, female, locking member, said first and second locking members being sized relative to each other so that said first locking member fits within said second locking member with said tapered surfaces contacting each other.

In some examples described herein, the male locking member may be moved using a first push rod and the nozzle may be positioned using a second push rod.

In some examples described herein, the female locking member may be moved using said second push rod.

In some examples described herein, the method may further comprise the step of providing a fluid through said first push rod, through said nozzle and said locking members and out of said nozzle.

In some examples described herein, the method may further comprise the step of removing said first and second push rods following the step of moving said male locking member.

In some examples described herein, the female locking member extends between a first end and a second end and the male locking member extends between a first end and a second end, and the outer tapered surface of said male locking member tapers outwards at said first angle from said first end to said second end, and the inner tapered surface of said second female locking member tapers outwards from said first end to said second end and wherein said step of moving said male locking member comprises moving said first end of said male locking member in the direction of the first end of said female locking member.

In some examples described herein, the female locking member extends between a first end and a second end and the male locking member extends between a first end and a second end, and wherein said male locking member has a wedge-shaped cross section between its first end and its second end, said wedge shaped cross-section being narrower at said first end than said second end of the male locking member and wherein said female locking member has a wedge-shaped cross section between its first end and its second end said wedge shaped cross-section being narrower at said second end than said first end of the female locking member and wherein said step of moving the male locking member comprises moving the narrower end of the wedge of the male locking member in the direction of the wider end of the wedge of the female locking member.

A nozzle positioning system is also described herein comprising: a body defining a cylindrical bore; a nozzle having a tubular shape with an outer cylindrical surface and an inner radial surface being initially movable within the cylindrical bore; and a tubular member positionable within the nozzle configured to cause the nozzle to become positionally fixed at a selected position within the bore in response to the tubular member being axially moved relative to the nozzle after the nozzle has been positioned at the selected position.

A nozzle positioning system for positioning a nozzle within a body of a valve is also described herein. In some examples, the nozzle may have an outer cylindrical surface and an inner radial surface. The assembly may further comprise a first, male, locking member provided within said nozzle, said first, male, locking member comprising a hollow tube having an outer cylindrical surface and an inner radial surface, and wherein the outer surface of the male locking means comprises a conical shape that is tapered at a first angle. The assembly may further comprise a second, female locking member provided within said nozzle, said second, female, locking member comprising a hollow tube having an outer cylindrical surface and an inner radial surface; said outer cylindrical surface of said female locking member being in contact with said inner radial surface of said nozzle. The inner surface of the female locking member has a conical shape that is tapered at a second angle and wherein said first angle and said second angle are equal. The first and second locking members may be sized relative to each other so that said first locking member fits within said second locking member with said tapered surfaces contacting each other after the nozzle has been correctly positioned within the valve.

In some examples described herein, said female locking member extends between a first end and a second end and said male locking member extends between a first end and a second end. The outer tapered surface of said male locking member may taper outwards at said first angle from said first end to said second end, and said inner tapered surface of said female locking member may taper outwards from said first end to said second end. The first end of said male locking member may contact said first end of said female locking member and said second end of said male locking member may contact said second end of said female locking member.

In some examples described herein, said female locking member may extend between a first end and a second end and said male locking member may extend between a first end and a second end, and said male locking member may have a wedge-shaped cross section between its first end and its second end, said wedge shaped cross-section being narrower at said first end than said second end of the male locking member. The female locking member may also have a wedge-shaped cross section between its first end and its second end, said wedge shaped cross-section being narrower at said second end than said first end of the female locking member and said narrower end of the wedge of the male locking member may contact the wider end of the wedge of the female locking member when the nozzle is in position within the valve.

In some examples described herein, said female locking member may extend between a first end and a second end, and said male locking member may extend between a first end and a second end, and the assembly may further comprise means for moving said male locking member inside said female locking member and for moving said first end of the male locking member in the direction of the first end of the female locking member.

In some examples described herein, said female locking member may extend between a first end and a second end, and said male locking member may extend between a first end and a second end, and said male and female locking members may have a wedge-shaped cross section between their first and second ends and the narrow end of the wedge of the male locking member may be in contact with the wide end of the wedge of the female locking member when the nozzle is in position in the valve.

Any of the methods or assemblies may be used in conjunction with a servovalve. Any of the nozzles described herein may be positioned within a tubular body of the servovalve and the outer surface of the nozzle may be in contact with an inner surface of the tubular body.

In any of the examples described herein, the first and second locking members may be made of a different material or materials than the nozzle.

DETAILED DESCRIPTION

Figure 1:
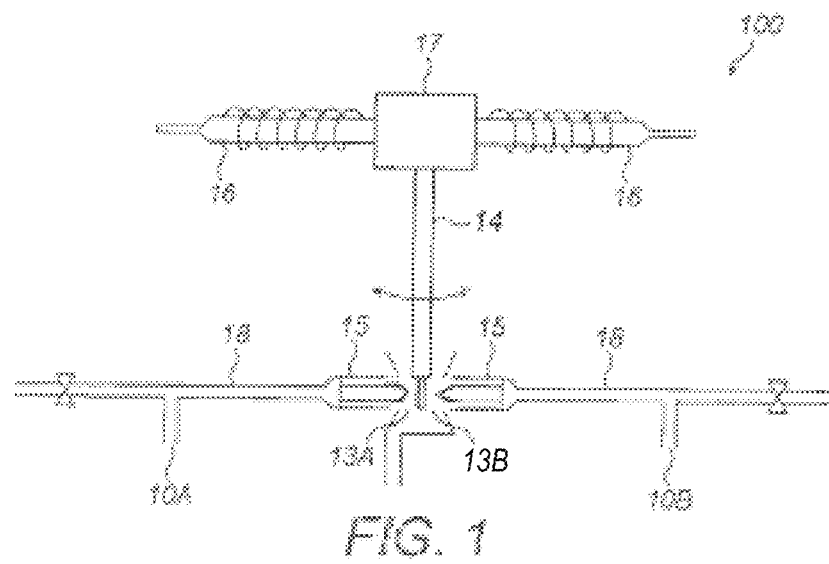
FIG. 1 is a schematic diagram showing a section of a known nozzle/flapper type servovalve.

An example of a known type of double flapper nozzle 100 that may be used with a servovalve is depicted, for example, in FIG. 1. FIG. 1 does not depict the entire servovalve, but only the main features of the nozzles and flapper. The device has a torque motor having an armature 17 with one or more coils 16, flapper 14 and nozzles 15. In use, fluid pressure is supplied to the points 10A and 10B. Orifices 13A and 13B are formed on each side between the flapper 14 and the opposing nozzles 15. As long as the flapper is centered, the orifices 13A and 13B are the same on both sides and the pressure drop to the return is the same. Pressure at 10A equals the pressure at 10B, and the spool connected to the servo (not shown) is in force balance. If the torque motor 17 rotates the flapper 14 clockwise then the orifice 13A on the left is smaller than the orifice 13B on the right, and the pressure at 10A will be greater than the pressure at 10B. This pressure difference shifts the spool of the servovalve to the right. As the spool shifts, it deflects a feedback spring connected to the servo (not shown). The spool continues to move until the spring force produces a torque that equals the electromagnetic torque produced by the current flowing through the coil 16 around the armature 17. At this point, the armature 17 is moved back to the center position, the flapper 14 is centered, the pressure becomes equal at 10A and 10B, and the spool stops. The spool of the servovalve stays in this position until the current through the coil 16 changes. Because of the feedback spring, the spool has a unique position corresponding to each current through the coil 17 ranging from 0 to rated current. At rated current, the spool is shifted to its full open position.

In order to control flow in a linear manner, the circumferential area created by the flapper distance to the nozzle must be smaller than the nozzle diameter, such that the circumferential area controls flow and not the nozzle diameter. In this way, the flow area varies linearly with flapper position. Also, the torque motor materials, windings and overall design features lead to accurate control of torque such that small movements of the flapper are possible. This leads to accurate control of the pilot spool, which in turns provides accurate control of the actuator.

The goal of the flapper and nozzles is to control the pressure acting on both sides of the pilot spool. When the flapper is in the neutral position, the nozzle flow areas are equal and the pressures on both side of the spool are equal.

In known devices and methods, the servovalve is calibrated by movement of the nozzles 15 into the correct position within the body of the servovalve. Once the nozzle is in the correct position and calibration has been completed, it is no longer possible to then move the nozzle at a later date. The nozzles 15 in known devices are only kept in place by close fit between the nozzle 15 outer surface and the inner surface of the body 18 within which it is placed. The tolerances and dimensions of these are therefore very tight, making the whole calibration process very difficult and also expensive. In addition to this, due to the high forces in the body of the servo, the nozzle and/or servo can often become damaged during calibration.

The examples described herein with reference to FIGS. 2 to 5 overcome such disadvantages as they provide a new and improved means of positioning and locking the nozzle in place during calibration that not only provides a sufficient press fit to hold the nozzle in the correct place, but also greatly improves the ease with which the calibration can be obtained in the first place.

A nozzle with changeable press fit and a new method and means for positioning and locking in place a nozzle within the body of a servovalve will now be described with reference to FIGS. 2 to 5. The same reference numerals are used to represent the corresponding features in each of the FIGS. 2 to 5.

Figure 2:
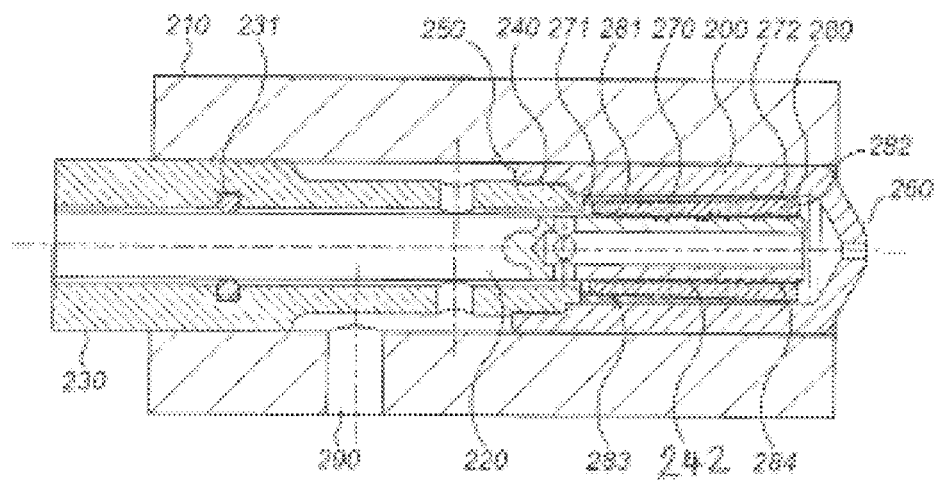
FIG. 2 is a schematic diagram showing a cross section of an example of a new nozzle positioning assembly during calibration.

FIG. 2 depicts a cross section of an example of a nozzle 200 positioned within the body 210 of a servovalve during calibration. As can be seen in this figure, the body of the servovalve in which the nozzle is positioned is a hollow tube. During calibration, fluid flow (fuel or air) 291 is provided through the supply port(s) 290 and directed towards and out of the end 260 of the nozzle 200, as shown in FIG. 4, the arrows 291 in this figure depicting the flow of fluid (or air).

The nozzle 200 is also hollow and comprises an elongated cylindrical wall extending between a first end 250 and a second end 260. In the example shown in FIGS. 2, 3 and 4, in use, the second end 260 of the nozzle is the end which would be closest to the flapper, as described above, with reference to FIG. 1. The first end 250 of the example shown in FIGS. 2 to 4 has a first opening which is wider than an opening at the second end 260.

In the example shown in FIG. 2, the means for locking the nozzle in position comprises a first, male, tubular, locking member 280 and a second, female, tubular, locking member 270. The female locking member 270 is provided within the nozzle and, in this example, results in an area within the valve wherein the inner circumference is reduced. The male locking member 280 is then shaped and sized so that it can be moved axially and relative to and within the female locking member 270 until at least a part of the outer surface of the male locking member 280 abuts at least a part of the inner surface of the female locking member 270. In the example shown in FIG. 2, the female locking member 270 is also movable axially relative to the nozzle.

Figure 3:
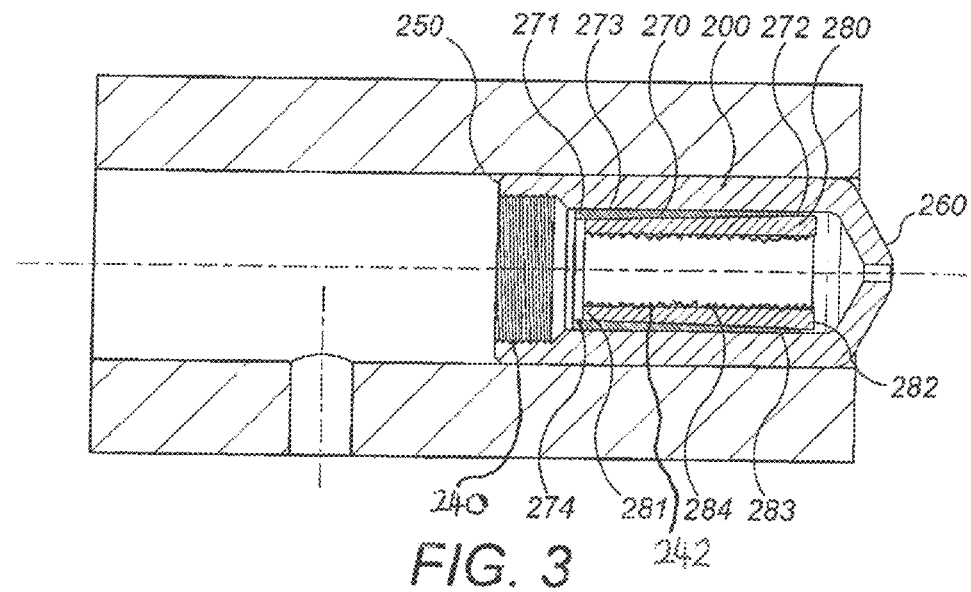
FIG. 3 is a schematic diagram showing a cross section of an example of a new nozzle positioning assembly after calibration.
Figure 4:
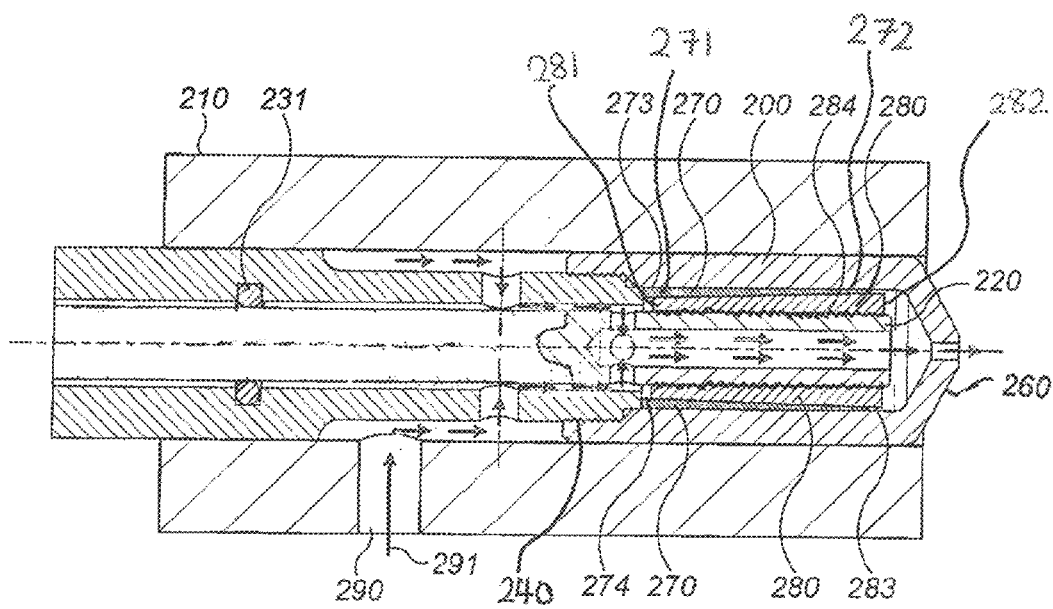
FIG. 4 is a schematic diagram showing the flow of fluid or air during calibration.

As can be seen in FIGS. 2 to 4, the female locking member 270 may have an outer surface 273 and an outer circumference that is sized so as to be in contact with the inner surface and inner circumference of the nozzle 200. In the example shown in FIG. 2, the female locking member 270 comprises a hollow tube with a cylindrical wall extending between first 271 and second 272 ends.

Figure 5:
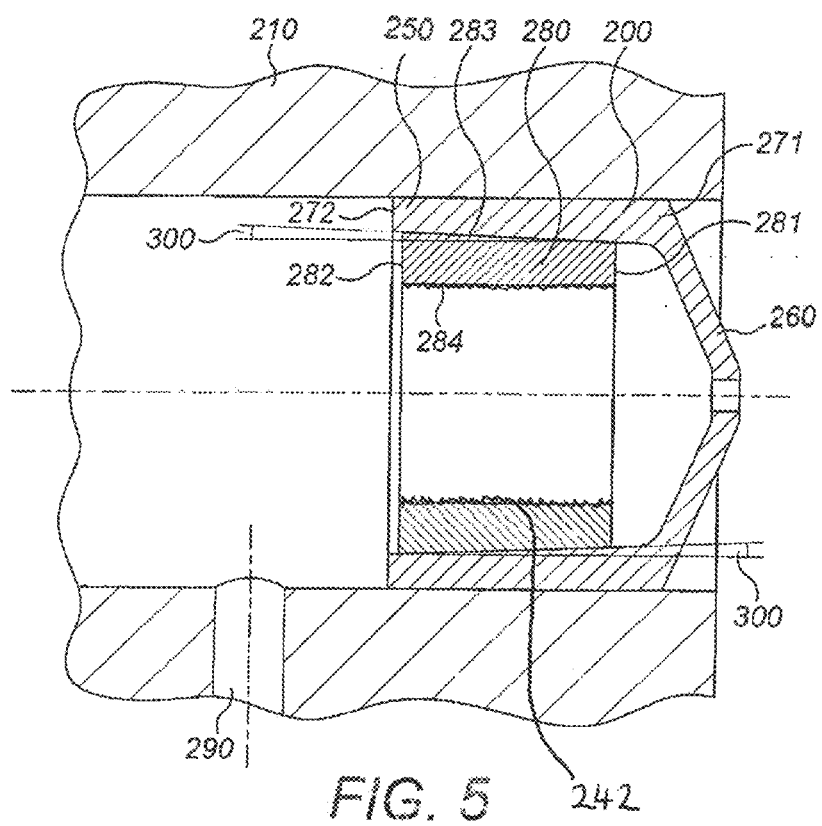
FIG. 5 shows a schematic diagram of another example of a nozzle positioning assembly

In some examples, the female locking member 270 may be integrally formed with the inner surface of the nozzle, and may even be the inner surface of the nozzle itself, as shown in FIG. 5. In this example, the female locking member simply comprises the inner surface of the nozzle 200, the inner surface being tapered.

At least a part of the inner circumference of the female locking member 270 (e.g. at its second end 272) is greater than at least a part of the outer circumference of the male locking member 280 (e.g. at its first end 281) so that the male locking member 280 may be moved inside the female locking member 270 as shown in FIG. 2.

In FIGS. 2 to 4, it can be seen that the thickness of the first and second locking members' cylindrical walls differ along their length to each form a wedge-shaped cross section. In detail, the outer circumference of the female locking member (i.e. that surface 273 which is in contact with the inner radial surface of the nozzle) remains the same between the first end 271 and second end 272 of the female locking member 270 (although this is not crucial, this is useful in that it results in an even distribution of force as against the nozzle), whilst the thickness of the wall of the female locking member 270 decreases in the direction of the second end 272 of the female locking member.

This results in the female locking member 270 having an inner radial surface 274 that has a truncated conical shape, with the wider part of the cone being at its second end 272. In other words, the female locking member 270 has walls that taper so that the size of the circumference of the inner surface of the female locking member 270 at its first end 271 is smaller than the circumference of the inner surface at its second end 272.

The male locking member 280 of the example shown in FIG. 2 also comprises a hollow tube with a cylindrical wall extending between a first 281 end and a second 282. The outer circumference of the male locking member 280 is smaller than the inner circumference of the nozzle 200 and so, in this example, is not in contact with the inner surface of the nozzle during calibration.

In contrast to the female locking member, the inner circumference of the surface of the male locking member 280 remains the same between its first and second ends, (this is not crucial but is useful as this is the surface that is in contact with the push-rod, as described later), whereas the walls taper such that the size of the circumference of the outer surface 283 of the male locking member 280 is smaller at its first end 281 than the circumference of the outer surface 283 at its second end 282. As can be seen in FIG. 2, the thickness of the wall of the male locking member 280 increases in the direction of the second end 282 of the male locking member 280. These features of the male locking member result in a hollow tube that has an outer surface 283 having a truncated conical shape.

The truncated conical shape of the inner surface 274 of the female locking member and the truncated conical shape of the outer surface 283 of the male locking member have a matching taper of equal angle (depicted by reference numeral 300 in FIG. 5). The locking members are also sized relative to each other so that the male member having a conical external shape fits inside the female member having a corresponding conical internal shape so that they contact each other and self-lock. The coefficient of friction ($\mu$) of the materials from which the locking members are made should be equal to or bigger than the tangent of an angle of the taper ($\alpha$): $\mu \geq \tan \alpha$ and for small angle ($\tan \alpha \approx \alpha$): $\mu \geq \alpha$. For example, if the locking members are made of aluminium, $\alpha$ will be lower than 45 degrees ($\mu=1$ for aluminium/aluminium). In some examples, the angle of the taper may be relatively small (from 1 to 2 degrees).

Due to the conical internal and external shapes of the female and male locking members, and as can be seen in FIGS. 2 to 5, the male locking member 280 may be described as having a wedge-shaped cross section between its first end 281 and its second end 282, the wedge shaped cross-section being narrower at the first end 281 than the second end 282. The female locking member 270 may also be described as having a wedge-shaped cross section between its first end 271 and its second end 272, the wedge shaped cross-section being narrower at the second end 272 than at the first end 271 of the female locking member 270. This means that when the male locking member 280 is moved within the female locking member, the narrower end 281 of the wedge of the male locking member 280 moves in the direction of the wider end 282 of the wedge of the female locking member. In other words, the first end 281 of the male locking member 280 is moved within the female locking member 270 in the direction of the female locking member's first end 271. The tapered outer surface 283 of the male locking member 280 therefore eventually contacts the tapered inner surface 274 of the female locking member 270 and the correspondingly tapered surfaces 283, 274 fit and slide against each other with increased pressure the further the male locking member is moved relative to and within the female member. Since the female locking member is in contact with the body 210, this, in turn, increases the pressure with which the nozzle 200 is pressed against the inner surface of the body and therefore locks the nozzle in place within the body via a self-locking press fit.

The movement of the nozzle and locking members may be achieved via the use of push rods.

As shown in FIG. 2, this may be achieved using first push rod 220 and second push rod 230. In this example, the second push rod 230 comprises a hollow cylindrical tube and the first push rod 220 is inserted within the hollow centre of the second push rod 230. An O-ring 231 may be provided to seal the space between the push rods 220 and 230. The first push rod 220 is also hollow. This is necessary, as during calibration, fluid flow (fuel or air) 291 must be provided through the servovalve body as shown in FIG. 4.

The first push rod 220 may be connected to the inner surface 284 of the male locking member 280 by a screw thread 242. The second push rod 230 may be connected to/with the first end 250 of the hollow nozzle 200 by a screw thread 240. During calibration, the first, male locking member 280 is first placed within the nozzle 200 using the first push rod 220 and then the second, female, locking member 270 is placed in the nozzle using the second push rod 230.

The second push rod 230 is used to control the position of the nozzle 200 within the servo body 210. The second push rod 230 also positions the female locking member 270 in the correct place within the nozzle. Calibration is then performed by inserting a fluid or gas 291 through the port 290 as shown in FIG. 4.

Once calibration of the nozzle is complete and the nozzle 200 is in the correct position, the first push rod 220 may then be used to axially move the male locking member 280 by pulling the male locking member 280 at least partially and/or fully inside of the female locking member 270. As described above, due to the fact that the female locking member 270 has a tapered inner surface 274 having a truncated conical shape and the male locking member 280 has a correspondingly tapered outer surface 283 also having a truncated conical shape, the angles of both tapers being equal, as the male locking member 280 is pulled at least partially inside of the hollow female locking member 270, a press fit is achieved. As the male locking member is pulled further and further inside of the female locking member, the press fit increases and the locking members self-lock. The nozzle is then held in place within the valve body due to these locking members.

FIG. 5 shows an alternative arrangement to FIGS. 2 to 4. The reference numerals in this figure represent the corresponding features found in FIGS. 2 to 4. As described above, in this example, the female locking member 270 is integrally formed with the inner surface of the nozzle, and in this case comprises the inner surface of the nozzle itself. For geometric reasons, in order for the male locking member 280 to be able to be inserted into the nozzle and female member, the slope of the tapered inner and outer surfaces of the female and male locking members must lie in the opposite direction to the examples shown in FIGS. 2 to 4. As can be seen in this figure, the first end 271 of the female locking member 271 (i.e. the nozzle 200) is therefore closest to the nozzle end 260. This is in contrast to the examples shown in FIGS. 2 to 4 where the first end 271 of the female locking member 270 is further away from the nozzle end 260. In this example, the first end 281 of the male locking member 280 is also closest to the nozzle end 260 in this example, with the second end 282 of the locking member 280 being further away from the nozzle end 260.

Contrary to known techniques, with the systems and methods described herein with reference to FIGS. 2 to 5, there is no risk that the female locking member 270 will be moved during this calibration process because it is being held in position by the first push rod 220 at one end and by the male locking member 280 at the other end.

Once calibration is complete, and the nozzle 200 is locked into the correct position within the body of the valve, the first and second push rods 220 230 may be unscrewed and removed, as shown in FIG. 3.

The examples described herein therefore provide significant advantages over known techniques in that they enable a much easier process of calibration than was previously possible.

The examples described herein also require much lower requirements for dimensions of nozzles and body. This is in contrast to known devices where the requirements are very high.

In addition to the above, the examples described herein have further advantages over known devices in that the press fit of the nozzle would not be affected by changes in temperature. In known devices, the nozzle is made from steel, whereas the body within which it is positioned is made from aluminium. Since aluminium has a higher thermal coefficient of expansion than steel, when there is an increase in temperature, the body of the valve expands at a greater rate and so the press fit between the outer surface of the steel nozzle and the inner surface of the body is reduced. The nozzle can therefore slip and the valve would then be damaged. In contrast to this, in the examples described herein, since it is the first and male locking members and not the nozzle surface itself that is holding the nozzle in position, in some examples, the female and male locking members may be made from the same material as the body so that with an increase of temperature, the press fit is not adversely affected.

In addition to the above, in current devices, it is not possible to change the position of the nozzle once it has been calibrated, as it would crack under the pressure from the movement. With the examples described herein, however, the nozzle may be more easily removed by simply removing the male locking member 280 from inside the first locking member 270 and thereby removing the press fit and allowing the nozzle to be moved or removed completely.

The invention claimed is:

1. A nozzle positioning system, comprising:
a body defining a cylindrical bore;
a nozzle having a tubular shape with an outer cylindrical surface and an inner radial surface, said nozzle being initially movable within the cylindrical bore; and
a first, male, tubular locking member being positionable within the nozzle;
said first, male, tubular locking member being provided within said nozzle, said first, male, tubular locking member comprising a hollow tube having an outer cylindrical surface and an inner radial surface, and wherein the outer surface of the first male locking member comprises a conical shape that is tapered at a first angle;
a second, female locking member provided within said nozzle, said second, female, locking member comprising a hollow tube having an outer cylindrical surface and an inner radial surface; said outer cylindrical surface of said female locking member being in contact with said inner radial surface of said nozzle, and wherein the inner surface of the second locking member has a conical shape that is tapered at a second angle;
and wherein said first angle and said second angle are equal;
said first and second locking members being configured to cause the nozzle to become positionally fixed at a selected position within the bore in response to the first, male, tubular locking member being axially moved relative to the nozzle after the nozzle has been positioned at the selected position within said cylindrical bore;
said first and second locking members being sized relative to each other so that said first, male tubular locking member fits within said second female locking member with said tapered surfaces contacting each other when said nozzle is in position.

2. The nozzle positioning system of claim 1, wherein said female locking member extends between a first end and a second end
and wherein said first, male, tubular locking member extends between a first end and a second end,
and wherein said outer tapered surface of said male locking member tapers outwards at said first angle from said first end to said second end, and
wherein said inner tapered surface of said female locking member tapers outwards from said first end to said second end
and wherein said first end of said first, male, tubular locking member contacts said first end of said female locking member and said second end of said first, male, tubular locking member contacts said second end of said female locking member when said nozzle is in position.

3. The nozzle positioning system of claim 1 wherein said second, female locking member extends between a first end and a second end
and wherein said first, male, tubular locking member extends between a first end and a second end, and wherein
said first, male, tubular locking member has a wedge-shaped cross section between its first end and its second end, said wedge shaped cross-section being narrower at said first end than said second end of the first, male, tubular locking member
and
wherein said second, female, locking member has a wedge-shaped cross section between its first end and its second end aid wedge shaped cross-section being narrower at said second end than said first end of the female locking member and
wherein said narrower end of the wedge of the first, male, tubular locking member contacts the wider end of the wedge of the second, female, locking member when said nozzle is in position.

4. The nozzle positioning system of claim 1 wherein said female locking member extends between a first end and a second end
and wherein said first, male, tubular locking member extends between a first end and a second end, and further comprising
means for moving said first, male, tubular locking member inside said female locking member and for moving said first end of the first, male, tubular locking member in the direction of the first end of the female locking member.

5. The nozzle positioning system of claim 1 wherein said female locking member extends between a first end and a second end
and wherein said first, male, tubular locking member extends between a first end and a second end, and wherein said first, male, tubular and female locking members have a wedge-shaped cross section between their first and second ends and wherein the narrow end of the wedge of the first, male, tubular locking member is in contact with the wide end of the wedge of the female locking member when said nozzle is in position.

6. The nozzle positioning system of claim 1 wherein said first and second locking members are made of a different material or materials than the nozzle.

7. A nozzle positioning system, comprising:
a body defining a cylindrical bore;
a nozzle having a tubular shape with an outer cylindrical surface and an inner radial surface, said nozzle being initially movable within the cylindrical bore; and
a first, male, tubular locking member being positionable within the nozzle;

wherein said nozzle is configured for positioning within a body of a valve, said first, male, tubular locking member being provided within said nozzle, said first, male, tubular locking member comprising a hollow tube having an outer cylindrical surface and an inner radial surface, and wherein the outer surface of the first male locking member comprises a conical shape that is tapered at a first angle;

a second, female locking member provided within said nozzle, said second, female, locking member comprising a hollow tube having an outer cylindrical surface and an inner radial surface; said outer cylindrical surface of said female locking member being in contact with said inner radial surface of said nozzle, and wherein the inner surface of the second locking member has a conical shape that is tapered at a second angle;

and wherein said first angle and said second angle are equal;

said first and second locking members being configured to cause the nozzle to become positionally fixed at a selected position within the bore in response to the first, male, tubular locking member being axially moved relative to the nozzle after the nozzle has been positioned at the selected position within said cylindrical bore;

said first and second locking members being sized relative to each other so that said first, male tubular locking member fits within said second female locking member with said tapered surfaces contacting each other when said nozzle is in position.

* * * * *